United States Patent

Okada et al.

(10) Patent No.: US 9,515,347 B2
(45) Date of Patent: Dec. 6, 2016

(54) LITHIUM SECONDARY BATTERY CATHODE

(75) Inventors: Shigeki Okada, Nishio (JP); Tsutomu Nanataki, Toyoake (JP); Nobuyuki Kobayashi, Nagoya (JP); Jun Yoshikawa, Nagoya (JP); Akira Urakawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 403 days.

(21) Appl. No.: 13/286,514

(22) Filed: Nov. 1, 2011

(65) Prior Publication Data

US 2012/0121979 A1 May 17, 2012

Related U.S. Application Data

(60) Provisional application No. 61/414,488, filed on Nov. 17, 2010.

(51) Int. Cl.
| | |
|---|---|
| *H01M 4/13* | (2010.01) |
| *H01M 10/052* | (2010.01) |
| *H01M 4/131* | (2010.01) |
| *H01M 4/505* | (2010.01) |
| *H01M 4/525* | (2010.01) |

(Continued)

(52) U.S. Cl.
CPC .......... *H01M 10/052* (2013.01); *H01M 4/131* (2013.01); *H01M 4/505* (2013.01); *H01M 4/525* (2013.01); *H01M 4/621* (2013.01); *H01M 10/0585* (2013.01); *H01M 4/623* (2013.01); *Y02E 60/122* (2013.01)

(58) Field of Classification Search
CPC .................................................... H01M 4/131
See application file for complete search history.

(56) References Cited

U.S. PATENT DOCUMENTS

| | | | |
|---|---|---|---|
| 6,423,453 B1 * | 7/2002 | Noda | 429/317 |
| 6,818,351 B2 | 11/2004 | Sunagawa et al. | |

(Continued)

FOREIGN PATENT DOCUMENTS

| | | |
|---|---|---|
| JP | 2001-085009 | 3/2001 |
| JP | 2002-251996 | 9/2002 |

(Continued)

OTHER PUBLICATIONS

International Search Report and Written Opinion dated Jan. 17, 2012.

(Continued)

*Primary Examiner* — Barbara Gilliam
*Assistant Examiner* — Stephan Essex
(74) *Attorney, Agent, or Firm* — Burr & Brown, PLLC

(57) ABSTRACT

An object of the present invention is to provide a lithium secondary battery cathode which can more improve characteristics of the battery. The cathode of the present invention includes an electroconductive cathode current collector, a plurality of plate-like particle formed of a cathode active material, and a binder containing microparticles formed of the cathode active material and being smaller than the plate-like particles. The plate-like particles are formed so as to have an aspect ratio of 4 to 50. The plate-like particles are arranged such that the particles cover the surface of the cathode current collector surface at a percent area of 85 to 98%. The binder is disposed so as to intervene between two adjacent plate-like particles.

7 Claims, 3 Drawing Sheets

(51) Int. Cl.
*H01M 4/62* (2006.01)
*H01M 10/0585* (2010.01)

(56) References Cited

U.S. PATENT DOCUMENTS

2003/0143465 A1\*  7/2003  Takahashi et al. ...... 429/231.95
2004/0175618 A1   9/2004  Inoue et al.
2010/0173204 A1\*  7/2010  Sugiura et al. ............ 429/231.8

FOREIGN PATENT DOCUMENTS

| JP | 2002-270173 | 9/2002 |
| JP | 2004-182564 | 7/2004 |
| WO | 2009/139397 A1 | 11/2009 |
| WO | 2010/074314 A1 | 7/2010 |

OTHER PUBLICATIONS

U.S. Appl. No. 13/286,513, filed Nov. 1, 2011, Okada et al.
Extended European Search Report (Application No. 11842232.8) dated Apr. 16, 2014.

\* cited by examiner

LITHIUM SECONDARY BATTERY CATHODE

BACKGROUND OF THE INVENTION

1. Field of the Invention

The present invention relates to a cathode of a lithium secondary battery.

2. Description of the Related Art

Lithium complex oxides (lithium transition metal oxides) such as lithium cobaltate ($LiCoO_2$) and lithium-nickel-manganese-cobalt complex oxides are widely known as a cathode active material for producing a cathode of a lithium secondary battery (may be referred to as a lithium ion secondary battery). As has been widely known, in the cathode active material, intercalation and deintercalation of lithium ions ($Li^+$) occur, whereby charge and discharge of the lithium secondary battery are carried out.

SUMMARY OF THE INVENTION

Hitherto, various efforts have been made to modify the structural characteristics of the cathode for enhancing performance (e.g., discharged capacity) of such batteries. For example, there has been carried out optimization of the particle size and packing rate of the cathode active material (see, for example, Japanese Patent Application Laid-Open (kokai) Nos. 2001-85009, 2002-251996, 2002-270173, and 2004-182564). However, these conventional techniques have not sufficiently improved the battery characteristics.

In this regard, the applicant of the present invention has studied such a cathode (see, for example, WO 2010/074314 A1). The present inventors have carried out extensive studies, and have found a specific configuration of a cathode which exhibits more excellent characteristics. The present invention has been accomplished on the basis of this finding.
—Configuration—

The lithium secondary battery cathode (hereinafter may be referred to simply as "cathode" in accordance with needs) of the present invention comprises:

an electroconductive current collector of cathode, a plurality of plate-like particles formed of a cathode active material, and a binder.

The aforementioned plate-like particle (hereinafter may be referred to simply as "cathode active material plate" in accordance with needs) is formed so as to have an aspect ratio of 4 to 50. As used herein, the term "aspect ratio" is a parameter which is obtained by dividing particle size d by thickness t. The particle size d is a length along a direction orthogonal to the thickness direction. The term "thickness direction" refers to a direction which defines the aforementioned thickness t.

The term "plate-like particle" refers to a particle whose external shape is plate-like. The concept of "plate-like" is apparent under social convention without need of particular description thereof in the present specification. However, if the description were to be added, "plate-like" would be defined, for example, as follows.

Namely, "plate-like" refers to a state in which, when a particle which is placed on a horizontal surface (a surface orthogonal to the vertical direction, along which gravity acts) stably (in a manner as not to further fall down even upon subjection to an external impact (excluding such a strong impact as to cause the particle to fly away from the horizontal surface)) is cut by a first plane and a second plane which are orthogonal to the horizontal surface (the first plane and the second plane intersect each other, typically at right angles), and the sections of the particle are observed, a dimension along the width direction (particle size d), which is along the horizontal surface (generally in parallel with the horizontal surface), is greater than a dimension along the thickness direction (thickness t), which is orthogonal to the width direction. Note that the term "thickness" does not include the space between the horizontal surface and the particle.

In other words, in the present invention, the aforementioned plate-like particle has a plate-like shape. A surface of the plate-like particle orthogonal to the thickness direction is referred to as a "plate surface." Since the "plate surface" is the widest surface on the plate-like particle, the "plate surface" may be referred to as the "principal surface." A surface which intersects (typically, at right angles) the plate surface (principal surface); i.e., a surface which intersects the plate surface direction (or in-plane direction), which is perpendicular to the thickness direction, is referred to as an "end surface," since the surface arises at an edge when the particle in a state of being stably placed on the horizontal surface is viewed in plane (when the particle in a state of being stably placed on the horizontal surface is viewed from above with respect to the vertical direction). Thus, the plate-like particle has a pair of plate surfaces which are generally in parallel with each other.

In the aforementioned plate-like particle, an inner plate surface—one of the two plate surfaces—is joined to a cathode-layer-contact surface, which is one surface of the current collector of cathode. In addition, a plurality of plate-like particles are two-dimensionally arranged such that the particles cover the cathode-layer-contact surface at a percent area of 85 to 98%.

The aforementioned binder intervenes between two adjacent plate-like particles such that the binder fills the space therebetween along the juxtaposition direction of the plate-like particles. Into the binder, microparticles formed of the cathode active material and being smaller than the plate-like particles.

The binder may be disposed such that the binder covers an outer plate surface, which is the other one of the two plate surfaces of the plate-like particle. That is, the cathode may have a stacked structure including a first layer which is formed of a plurality of cathode active material plates and the binder disposed between plates, and a second layer, which is the binder layer disposed on the first layer. In this case, the first layer has a thickness t. When the second layer has a thickness t2 and the relationship r=t2/t is satisfies, r preferably satisfies the condition $0.02 \leq r \leq 0.2$.

A specific example of the cathode active material is a lithium complex oxide. The lithium complex oxide has a crystal structure, for example, a layered rock salt structure. As used herein, the term "layered rock salt structure" refers to a crystal structure in which lithium layers and layers of a transition metal other than lithium are alternatively with an oxygen layer therebetween (typically, $\alpha$-$NafeO_2$ type structure: cubic rock salt type structure in which transition metal element and lithium element are arrayed orderly in the direction of the [111] axis). The lithium complex oxide serving as the cathode active material may also be such an oxide having no layered rock salt structure but has a spinel structure (e.g., lithium manganate $LiMn_2O_4$ or lithium nickel manganate $LiNi_{0.25}Mn_{0.75}O_4$).

In the case where the lithium complex oxide serving as the cathode active material forming the plate-like particles has a layered rock salt structure, the ratio of intensity of diffraction by the (003) plane to intensity of diffraction by the (104)

plane, (003)/(104), as obtained through X-ray diffraction of a surface (plate surface) of the plate-like particle, is preferably 1.6 or less. In the case where the cathode active material microparticles which are incorporated into the binder assume the form of plate-like particles, X-ray diffraction of a surface (plate surface) of each plate-like particle preferably falls within the same range.

—Effects—

In the cathode active material plates (plate-like particles), intercalation and deintercalation of lithium ions ($Li^+$) occur during charge and discharge, resulting in change in dimensions of the plates. In this case, in the cathode of the present invention having the aforementioned structural characteristics, the stress generated by the dimensional change is relaxed by the binder. In addition, since the cathode active material plates are suitably sustained on the current collector of cathode (cathode-layer-contact surface) by means of the binder, release of the cathode active material plates from the cathode-layer-contact surface is effectively prevented, whereby cycle characteristics are enhanced.

Furthermore, since the binder contains the cathode active material microparticles, the packing ratio and surface area of the cathode active material increase to a maximum degree, leading to excellent discharged capacity (discharged capacity retaining performance).

DETAILED DESCRIPTION OF THE INVENTION

Preferred embodiments of the present invention will next be described with reference to examples and comparative examples. The following description of the embodiments is nothing more than the specific description of mere example embodiments of the present invention to the possible extent in order to fulfill description requirements (descriptive requirement and enabling requirement) of specifications required by law.

Thus, as will be described later, naturally, the present invention is not limited to the specific configurations of embodiments and examples to be described below. Modifications that can be made to the embodiments and examples are collectively described herein at the end to a maximum possible extent, since insertion thereof into the description of the embodiments would disturb understanding of consistent description of the embodiments.

1. Configuration of Lithium Secondary Battery

Figure 1A:
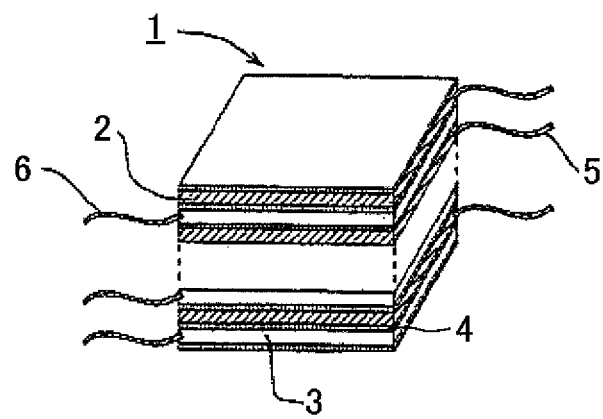
FIG. 1A is a sectional view of the schematic configuration of an example lithium secondary battery to which one embodiment of the present invention is applied.

FIG. 1A is a sectional view of the schematic configuration of an example lithium secondary battery 1 to which one embodiment of the present invention is applied. Referring to FIG. 1A, the lithium secondary battery 1 is a so-called liquid-electrolyte type battery and includes cathodes 2, anodes 3, separators 4, cathode tabs 5, and anode tabs 6.

The separator 4 is provided between the cathode 2 and the anode 3. That is, the cathode 2, the separator 4, and the anode 3 are stacked in this order. The cathode tabs 5 are electrically connected to the respective cathodes 2. Similarly, the anode tabs 6 are electrically connected to the respective anodes 3.

The lithium secondary battery 1 shown in FIG. 1A is configured such that a stack of the cathodes 2, the separators 4, and the anodes 3, and an electrolytic solution containing a lithium compound as an electrolyte are liquid-tightly sealed in a specific battery casing (not illustrated).

Figure 1B:
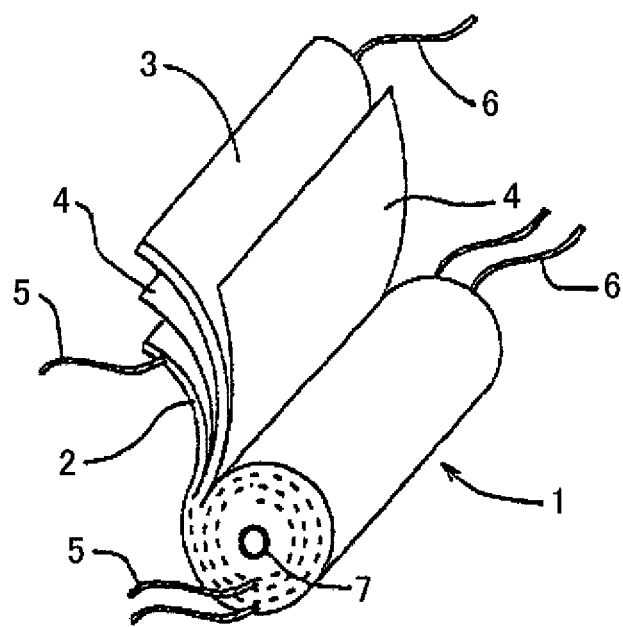
FIG. 1B is a perspective view of the schematic configuration of another example lithium secondary battery to which one embodiment of the present invention is applied.

FIG. 1B is a perspective view of the schematic configuration of another example lithium secondary battery 1 to which one embodiment of the present invention is applied. Referring to FIG. 1A, this lithium secondary battery 1 is also a liquid-electrolyte type battery and includes a cathode 2, an anode 3, separators 4, cathode tabs 5, anode tabs 6, and a core 7.

The lithium secondary battery 1 shown in FIG. 1B is configured such that an internal electrode formed through winding, onto the core 7, of a stack of the cathode 2, the separators 4, and the anode 3, and the aforementioned electrolytic solution are liquid-tightly sealed in a specific battery casing (not illustrated).

Figure 2:
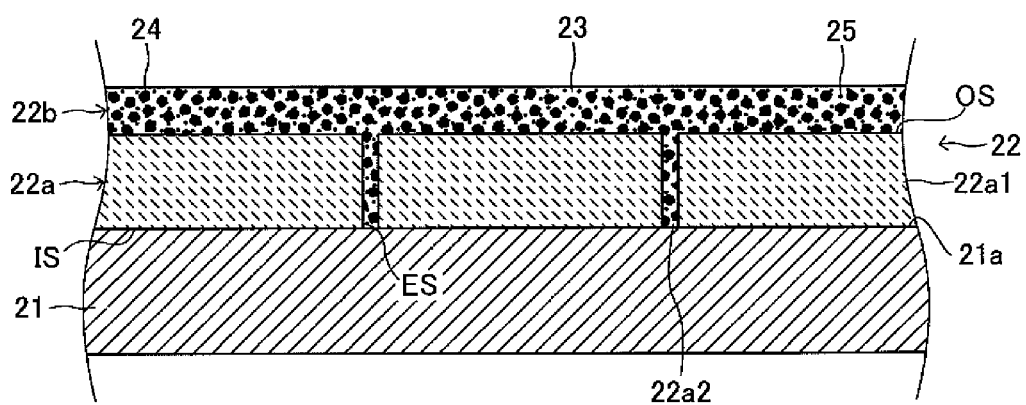
FIG. 2 is an enlarged sectional view of the cathode shown in FIG. 1A or 1B.

FIG. 2 is an enlarged sectional view of the cathode 2 (an embodiment of the invention) shown in FIG. 1A or 1B. Referring to FIG. 2, the cathode 2 includes a cathode current collector 21 formed of an electroconductive material (e.g., metal) and a cathode active material layer (cathode layer) 22 formed on a cathode-layer-contact surface 21a, which is one surface of the cathode current collector 21. That is, the cathode 2 has a joined (stacked) structure of the cathode current collector 21 and the cathode active material layer 22.

The cathode active material layer 22 has a first layer 22a and a second layer 22b. The first layer 22a is stacked on and joined to the cathode current collector 21. The second layer 22b is stacked on and joined to the first layer 22a. That is, the first layer 22a is joined to the cathode-layer-contact surface 21a of the cathode current collector 21, and the second layer 22b is joined to the first layer 22a.

The first layer 22a has cathode active material plate-like particles 22a1 and a filler portion 22a2. One surface of the two plate surface of the cathode active material plate-like particle 22a1 (plate-like cathode active material) is an inner plate surface IS, which is joined to the cathode-layer-contact surface 21a. A plurality of cathode active material plate-like particles 22a1 are two-dimensionally arranged on the surface of the cathode-layer-contact surface 21a. Specifically, the cathode active material plate-like particles 22a1 are disposed at such a density that the particles are not stacked on one another, whereby the cathode-layer-contact surface 21a is covered with the cathode active material plate-like particles 22a1 at a percent area of 85 to 98%.

The filler portion 22a2 is provided such that the portion intervenes between two adjacent end surfaces ESs of cathode active material plate-like particles 22a1. That is, the filler portion 22a2 fills the space between two adjacent cathode active material plate-like particles 22a1.

The second layer 22b is disposed so as to cover an outer plate surface OS, which is the other plate surface of the cathode active material plate-like particle 22a1, differing from the inner plate surface IS. The filler portion 22a2 and the second layer 22b are formed from a mixture of a binder 23, cathode active material microparticles 24, and an electroconducting additive 25.

In other words, the binder 23 fills the space between two adjacent cathode active material plate-like particles 22a1, and is disposed so as to cover the outer plate surface OS of the cathode active material plate-like particle 22a1. The binder 23 contains the cathode active material microparticles 24 and the electroconducting additive 25.

The cathode active material plate-like particles 22a1 and the cathode active material microparticles 24 are formed of a lithium complex oxide having a composition represented by the following formula:

(wherein M represents at least one member selected from the group consisting of Co, Ni, Al, Mn, and Mg).

In this embodiment, the cathode active material layer 22 is formed such that r satisfies the condition $0.02 \leq r \leq 0.2$ (r=t2/t), wherein t represents the thickness of the first layer 22a, and t2 represents the thickness of the second layer 22b.

2. Effects Attained by the Structure of the Embodiment

In the cathode 2 having the aforementioned structure, intercalation and deintercalation of lithium ions occur during charge and discharge, resulting in dimensional changes of cathode active material plate-like particles 22a1 and cathode active material microparticles 24. In this case, in the cathode having the aforementioned structural characteristics, the stress generated by the dimensional change is relaxed by the binder 23, which is present in the space between cathode active material plate-like particles 22a1.

The space between cathode active material plate-like particles 22a1 is filled with the binder 23, and the outer plate surface OS and the filler portion 22a2 of the cathode active material plate-like particle 22a1 are covered with the second layer 22b containing the binder 23. Thus, release of cathode active material plate-like particles 22a1 from the cathode-layer-contact surface 21a is effectively prevented.

According to the structural characteristics, cracking or peeling at the cathode active material layer 22, which would otherwise be caused by repeated charge-discharge cycles, can be prevented to a maximum extent, whereby cycle characteristics are enhanced. In this case, since the binder 23 contains the cathode active material microparticles 24, the cathode active material packing ratio and surface area of the cathode active material layer 22 can be increased to a maximum extent, leading to a discharged capacity (discharged capacity retaining performance) which is more excellent than that attained through the aforementioned conventional techniques. The mechanism has not been elucidated in detail, but one possible reason is as follows.

A non-patent document (Shota Kobayashi, Yoshiharu Uchimoto, "Lithium Ion Phase-Transfer Reaction at the Interface between the Lithium Manganese Oxide Electrode and the Nonaqueous Electrolyte," J. Phys. Chem. B 2005, 109, p. 13322-13326) discloses the following process occurring during discharge at cathode. (1) Solvated lithium ions are adsorbed by the surface of the cathode active material before insertion of lithium ions into the cathode active material. In the process, a part of solvent molecules are released from lithium ions. (2) The remaining solvent molecules are released from lithium ions, and then the lithium ions are inserted into the cathode active material.

In the cathode 2 having the aforementioned structure, the cathode active material surface area can be increased without reducing the cathode active material packing ratio of the cathode active material layer 22, whereby the number of reaction sites involved in the aforementioned desolvation process can be increased. Conceivably, excellent discharged capacity (discharged capacity retaining performance) can be attained through the above mechanism.

As mentioned above, in the cathode 2 having the aforementioned structure, the cathode active material plate-like particles 22a1 placed on the cathode-layer-contact surface 21a of the cathode current collector 21 are coated with the binder 23 containing the cathode active material microparticles 24. Therefore, the thickness of the cathode active material layer 22 (thickness of the cathode 2) is adjusted to one predetermined value to a maximum extent, and the stress of a separator 4 of a battery as shown in FIG. 1B is relaxed. Thus, in the lithium secondary battery 1 shown in FIG. 1B, short circuit, which would otherwise be caused by breakage of the separator 4 by the cathode active material plate-like particles 22a1, can be prevented to a maximum extent.

Particularly when the cathode active material (cathode active material plate-like particles 22a1 and/or cathode active material microparticles 24) contained in the cathode active material layer 22 is a lithium complex oxide having a layered rock salt structure, at least the degree of orientation of (104) plane of the cathode active material plate-like particle 22a1 (the degree of exposure of (104) plane on a surface, particularly a plate surface) is preferably high. Specifically, the peak intensity ratio (003)/(104) is preferably 1.6 or less. One possible reason therefor is as follows.

According to the configuration of this embodiment, the aforementioned process (1) is promoted by an increase in specific surface of the plate-like particle attributable to the presence of the second layer 22b, and the (104) plane, where lithium ions are readily intercalated into a surface (plate surface), is exposed, whereby the process (2) is also promoted. Thus, intercalation of lithium ions are very smoothly performed during a discharge process, whereby excellent discharged capacity (discharged capacity retaining performance) are attained.

In the meantime, cracks may be caused in the cathode active material plate-like particles 22a1 forming the first layer 22a at the time of manufacturing the lithium secondary battery 1. For example, applied pressure causes abovementioned cracks when joining the cathode current collector 21 and the cathode active material layer 22.

Also, internal stress may be accumulated in the cathode active material plate-like particles 22a1 due to crystal strain accompanied by transfer of Lithium ions when charge and discharge are repeated. The cracks may be occurred in the cathode active material plate-like particles 22a1 by foregoing accumulation of internal stress.

In this regard, excellent battery characteristics are maintained by the configuration of this embodiment in the case that the cracks are occurred in the cathode active material plate-like particles 22a1. That is because conductive components (which are mainly the electroconducting additives 25) contained in the second layer 22b or the filler portion 22a2 interfuse in the cracks. That is, the configuration of this embodiment realizes self-repairing ability of the cathode active material layer 22 against cracks.

3. Specific Examples (Examples)

There will next be described a specific example of the method for producing the cathode 2 of the present embodiment, along with the results of evaluation thereof.

3-1. Production Method 3-1-1. Production of Cathode Active Material Plate (Cathode Active Material Plate-Like Particle)

Specific Example 1: One-Step Heat Treatment Process (1) Preparation of Slurry

Li$_2$CO$_3$ powder (particle size: 10 to 50 μm; product of Kanto Chemical Inc.) (33.1 parts by weight), NiO powder (particle size: 1 to 10 μm; product of Seido Kagaku Kogyo Co., Ltd.) (50.2 parts by weight), Co$_3$O$_4$ powder (particle size: 1 to 5 μm; product of Seido Kagaku Kogyo Co., Ltd.) (14.4 parts by weight), and Al$_2$O$_3$ powder (particle size: 1 to 10 μm; product of Showa Denko K.K.) (2.3 parts by weight) were mixed and milled by means of a ball mill to a mean particle size of 0.5 μm. The resultant powder (100 parts by weight) was mixed with a dispersion medium (toluene:2-propanol=1:1) (100 parts by weight), a binder (polyvinyl butyral: product No. BM-2; product of Sekisui Chemical Co. Ltd.) (10 parts by weight), a plasticizer (DOP: Bis(2-ethylhexyl)phthalate; product of Kurogane Kasei Co., Ltd.) (4 parts by weight), and a dispersant (product name RHEODOL SPO-30, product of Kao Corp.) (2 parts by weight).

The resultant mixture was stirred under reduced pressure for defoaming, and the viscosity thereof was adjusted to 3,000 to 4,000 cP. (The viscosity was measured by means of an LVT-type viscometer, a product of Brookfield Co., Ltd. The same procedure was applied to the following Example).

(2) Forming

The thus-prepared slurry was formed into a sheet on a PET film through the doctor blade process such that the thickness of the sheet as measured after drying was adjusted to 50 μm. The sheet product was removed from the PET film and was pierced into numerous pieces by means of a multi-punching machine (Type: NP-7150, product of UHT corporation) then 1-mm-square compacts were prepared.

(3) Heat Treatment

The thus-produced square pieces were placed on a setter (dimensions: 90 mm square×1 mm high) made of zirconia and sintered in an oxygen atmosphere at 800° C. for 10 hours, to thereby yield cathode active material plates having a composition of $Li(Ni_{0.75}Co_{0.2}Al_{0.05})O_2$. After sintering, the produced cathode active material plates were found to have a thickness of 50 μm and a square side of 900 μm.

Specific Example 2: Two-Step Heat Treatment Process (1) Preparation of Slurry

NiO powder (particle size: 1 to 10 μm; product of Seido Kagaku Kogyo Co., Ltd.) (75.1 parts by weight), $Co_3O_4$ powder (particle size: 1 to 5 μm; product of Seido Kagaku Kogyo Co., Ltd.) (21.5 parts by weight), and $Al_2O_3$ powder (particle size: 1 to 10 μm; product of Showa Denko K.K.) (3.4 parts by weight) were mixed and milled. The powder was heated in air at 1,000° C. for five hours, to thereby synthesize $(Ni_{0.75}Co_{0.2}Al_{0.05})O$ powder. The powder was further milled by means of a ball mill, to thereby prepare raw material particles of $(Ni_{0.75}Co_{0.2}Al_{0.05})O$. The raw material (100 parts by weight) was mixed with a dispersion medium (toluene:2-propanol=1:1) (100 parts by weight), a binder (polyvinyl butyral: product No. BM-2; product of Sekisui Chemical Co. Ltd.) (10 parts by weight), a plasticizer (DOP: Bis(2-ethylhexyl)phthalate; product of Kurogane Kasei Co., Ltd.) (4 parts by weight), and a dispersant (product name RHEODOL SPO-30, product of Kao Corp.) (2 parts by weight). The resultant mixture was stirred under reduced pressure for defoaming, and the viscosity thereof was adjusted to 3,000 to 4,000 cP.

(2) Forming

The thus-prepared slurry was formed into a sheet on a PET film through the doctor blade process such that the thickness of the sheet as measured after drying was adjusted to 50 μm. The sheet product was removed from the PET film and was pierced into numerous pieces by means of a multi-punching machine (Type: NP-7150, product of UHT corporation) then 1-mm-square compacts were prepared.

(3) Calcining

The thus-produced square pieces were placed on a setter (dimensions: 90 mm square×1 mm high) made of zirconia and calcined in air at 900° C. for 10 hours.

(4) Incorporation of Lithium

The thus-produced $(Ni_{0.75}Co_{0.2}Al_{0.05})O$ ceramic plates and LiOH powder (product of Kanto Chemical Inc.) were mixed at a mole ratio $Li/(Ni_{0.75}Co_{0.2}Al_{0.05})$ of 1.5, and the mixture was sintered in an oxygen atmosphere at 800° C. for 10 hours, to thereby yield cathode active material plates having a composition of $Li(Ni_{0.75}Co_{0.2}Al_{0.05})O_2$. After sintering, the produced cathode active material plates were found to have a thickness of 50 μm and a square side of 1,000 μm.

3-1-2. Production of Cathode (1) Joining of Cathode Active Material Plates to Cathode Current Collector The thus-produced cathode active material plates were scatteredly placed on an aluminum tray, and then moved to the center of the tray from each corner by means of a spatula, whereby the plates were 2-dimensionally disposed without overlapping.

Subsequently, an electroconductive synthetic resin was applied, at a small coating thickness, onto aluminum foil having a thickness of 20 μm for forming a cathode current collector. Then, the aluminum foil was placed on the cathode active material plates which were 2-dimensionally disposed on the tray, such that the conductive-resin-coated surface of the aluminum foil faced the cathode active material plates. The aluminum foil was lightly pressed to the plates to ensure tight bonding between the cathode active material plates and the aluminum foil, whereby the aluminum foil was joined to the cathode active material plates.

(2) Preparation of Cathode-Material-Mixture Paste

A powder mixture of $Li_2CO_3$, NiO, $Co_3O_4$, and $Al_2O_3$ prepared at the same compositional proportions was sintered in oxygen at 800° C. for 10 hours, to thereby produce a powder of cathode active material particles having a composition of $Li(Ni_{0.75}Co_{0.2}Al_{0.05})O_2$. The thus-produced cathode active material powder (92 parts by weight), poly (vinylidene fluoride) serving as a binder (3 parts by weight), acetylene black serving as a conduction additive (5 parts by weight), and N-methyl-2-pyrrolidone serving as a solvent were kneaded, to thereby prepare a cathode-material-mixture paste for forming the second layer 22b and the filler portion 22a2.

(3) Application of Cathode-Material-Mixture Paste

The thus-prepared cathode-material-mixture paste was applied, by means of a screen printing apparatus, onto cathode active material plates supported by aluminum foil, to thereby form a pre-cathode sheet. The pre-cathode sheet was found to have a thickness of 75 μm as measured after drying, and the cathode-material-mixture paste (in which cathode active material powder and conductive material are contained)-coated layer has a thickness of 3 μm as measured after drying, the thickness not including the thickness of aluminum foil and that of the cathode active material plate.

3-2. Evaluation Method

The production conditions employed in the Example were modified as desired, to thereby produce cathodes of Experiment Examples 1 to 5 and Comparative Examples 1 to 3 (in Table 1 given below, "Specific Example 1" corresponds to "Experiment Example 1," and "Specific Example 2" corresponds to "Experiment Example 5"). The evaluation method therefor will next be described.

3-2-1. Percent Packing (Packing Ratio)

The disposition state of the cathode active material plates, which had been bonded onto the aluminum foil as described in 3-1-2. (1), was observed by a digital camera, and the taken photograph was analyzed by image analysis software, to thereby calculate the 2-dimensional percent packing of the cathode active material plates on the aluminum foil.

3-2-2. Degree of Orientation

The orientation degree of (104) plane of a cathode active material plate was evaluated through X-ray diffractometry (XRD) in the following manner.

The cathode active material plates were placed on a planar glass such that the plate surfaces of the cathode active material plates were in parallel with the planar glass surface and overlapping was prevented. By means of an XRD apparatus (GEIGER FLEX RAD-IB, product of Rigaku Corp.), the surfaces of the plate-like particles (cathode active material plates) were irradiated with X-ray so as to measure an XRD profile, thereby obtaining the ratio of intensity (peak height) of diffraction by the (003) plane to intensity (peak height) of diffraction by the (104) plane, (003)/(104). In the above-mentioned method, the plate surface of the cathode active material plates are in surface contact with the planar glass surface, so that the particle plate surface is in parallel with the glass substrate surface. Thus, according to the above-mentioned method, there is obtained a profile of diffraction by crystal faces present in parallel with crystal faces of the particle plate surface; i.e., a profile of diffraction by crystal faces oriented in a plate surface direction of a plate-like particle.

3-2-3. Cell Characteristics (1) Discharged Capacity (Coin Cell)

The pre-cathode sheet produced through the aforementioned procedure was cut into disks (diameter: 15 mm) serving as cathodes. One of the thus-produced cathodes, an anode formed of a lithium metal plate, an anode current collector plate made of stainless steel, and a separator were arranged in the order of cathode—separator—anode—anode current collector plate, such that the aluminum foil of the cathode is disposed on the outside (the side opposite the separator). The stacked body was filled with an electrolytic solution, thereby yielding a coin cell. The electrolytic solution was prepared by dissolving $LiPF_6$ in an equivolume mixture of ethylene carbonate (EC) and diethyl carbonate (DEC) serving as an organic solvent to a concentration of 1 mol/L.

The thus-produced coin cell was tested. Specifically, one cycle consists of the following charge and discharge operations: constant-current charge is carried out at a 1 C rate of current until the cell voltage becomes 4.3 V; subsequently, constant-voltage charge is carried out under a current condition of maintaining the cell voltage at 4.3 V, until the current drops to 1/20, followed by 10 minutes rest; and then, constant-current discharge is carried out at a 1 C rate of current until the cell voltage becomes 3.0 V, followed by 10 minutes rest. Two cycles were performed at 25° C. The discharged capacity measured in the second cycle was employed as "discharged capacity" of the coin cell.

(2) Durability (Rectangular Battery)

By use of the rectangular pre-cathode sheet produced through the aforementioned procedure, a rectangular battery (60 mm×35 mm×4 mm) was produced. The anode of the battery was produced by adding N-methyl-2-pyrrolidone to carbon black (90 parts by weight) and poly(vinylidene fluoride) (10 parts by weight), sufficiently kneading the mixture, applying the kneaded product to a copper current collector having a thickness of 14 µm, and drying and pressing. The thus-produced anode was found to have a thickness of 100 µm. The electrolytic solution was prepared by dissolving $LiPF_6$ in an equivolume mixture of ethylene carbonate (EC) and methyl ethyl carbonate (MEC) serving as an organic solvent to a concentration of 1 mol/L. The separator employed was polypropylene porous film.

The thus-produced rectangular battery was subjected to the aforementioned charge-discharge cycle test at 25° C., each cycle being performed at a 1 C rate of current and a voltage of 3.0 V to 4.3 V. After performance of 100 cycles of charge-discharge, the discharged capacity of the battery was measured. The value was divided by the initial discharged capacity of the same battery, to thereby obtain capacity retention percentage (%).

After completion of the test, the battery was decomposed, and the cathode was cut into square pieces (about 1 cm×about 1 cm). Each piece was embedded in resin and polished to develop a cross-section. The surface of the section was observed under a scanning electron microscope, to thereby check the presence of falling of the cathode active material plates from the aluminum foil, and cracking of the cathode active material plates. Furthermore, the surface of the separator was observed in order to check for breakage thereof.

3-3. Results of Evaluation

In Experiment Examples 2 and 4, and Comparative Examples 1 and 2, the punch size at the piercing by means of a multi-punching machine performed in Example (Experiment Example 1) was changed, to thereby modify the aspect ratio (400 µm×400 µm square in Experiment Example 2, 2.5 mm×2.5 mm square in Experiment Example 4, 300 µm×300 µm square in Comparative Example 1, and 5 mm×5 mm square in Comparative Example 2). In Experiment Example 3, the thickness of the cathode-material-mixture paste coating layer was increased as compared with that employed in the Examples. In Comparative Example 3, no cathode-material-mixture paste was applied.

Tables 1 to 4 show the production conditions and evaluation results employed in the Experiment Examples and Comparative Examples.

TABLE 1

|  | Punch size | t (µm) | t2 (µm) | r = t2/t |
|---|---|---|---|---|
| Exp. Ex. 1 | 1 mm | 50 | 3 | 0.06 |
| Exp. Ex. 2 | 400 µm | 50 | 3 | 0.06 |
| Exp. Ex. 3 | 1 mm | 50 | 10 | 0.20 |
| Exp. Ex. 4 | 2.5 mm | 50 | 3 | 0.06 |
| Exp. Ex. 5 | 1 mm | 50 | 3 | 0.06 |
| Comp. Ex. 1 | 300 µm | 50 | 3 | 0.06 |
| Comp. Ex. 2 | 5 mm | 50 | 3 | 0.06 |
| Comp. Ex. 3 | 1 mm | 50 | 0 | 0.00 |

TABLE 2

|  | Aspect ratio | Percent packing (%) |
|---|---|---|
| Exp. Ex. 1 | 18 | 98 |
| Exp. Ex. 2 | 8 | 95 |
| Exp. Ex. 3 | 18 | 98 |
| Exp. Ex. 4 | 45 | 98 |
| Exp. Ex. 5 | 20 | 98 |
| Comp. Ex. 1 | 6 | 80 |
| Comp. Ex. 2 | 90 | 98 |
| Comp. Ex. 3 | 18 | 98 |

TABLE 3

|  | Peak intensity ratio (003)/(104) | Discharged capacity (mAh/g) | Capacity retention percentage (%) |
| --- | --- | --- | --- |
| Exp. Ex. 1 | 2.0 | 160 | 96 |
| Exp. Ex. 2 | 2.0 | 160 | 98 |
| Exp. Ex. 3 | 2.0 | 150 | 96 |
| Exp. Ex. 4 | 2.0 | 160 | 94 |
| Exp. Ex. 5 | 1.0 | 165 | 96 |
| Comp. Ex. 1 | 2.0 | 110 | 98 |
| Comp. Ex. 2 | 2.0 | 110 | 60 |
| Comp. Ex. 3 | 2.0 | 70 | — |

TABLE 4

|  | Cathode active material plate falling | Cathode active material plate cracking | Separator breakage |
| --- | --- | --- | --- |
| Exp. Ex. 1 | N/A | N/A | N/A |
| Exp. Ex. 2 | N/A | N/A | N/A |
| Exp. Ex. 3 | N/A | N/A | N/A |
| Exp. Ex. 4 | N/A | N/A | N/A |
| Exp. Ex. 5 | N/A | N/A | N/A |
| Comp. Ex. 1 | N/A | N/A | N/A |
| Comp. Ex. 2 | N/A | A | N/A |
| Comp. Ex. 3 | A | N/A | A |

Separately, Experiment Example 1 was repeated, except that the cathode active material plates were intentionally placed on an aluminum tray in a slightly scattered state, and the produced cathode was evaluated. The percent packing was 85%, the discharged capacity was 150 mAh/g, and the capacity retention percentage was 99%.

The aforementioned tests have revealed the following. Excellent discharged capacity (discharged capacity retaining performance) and capacity retention percentage (cycle characteristic) can be attained when the percent packing falls within a range of 85 to 98%. When the percent packing is excessively low, capacity density decreases, whereas when the percent packing is excessively high, the aforementioned stress relaxation effect upon charge and discharge is insufficient, possibly resulting in deterioration in cycle characteristic.

The aspect ratio is preferably 4 to 50. In Comparative Example 2, in which the aspect ratio is very large, discharged capacity and capacity retention percentage decreased, and cracks were generated in cathode active material plates (see Table 4). When the aspect ratio is excessively large, the aforementioned stress relaxation effect upon charge and discharge is insufficient, possibly resulting in deterioration in cycle characteristic.

Regarding r; i.e., the ratio of the thickness of the second layer 22b to that of the first layer 22a, the most excellent discharged capacity retaining performance and cycle characteristic were attained in Experiment Examples 1 and 2, in which the ratio of the thickness of the second layer 22b to that of the first layer 22a was considerably small (about 0.06). In Experiment Example 3, in which the second layer 22b was relatively thicker, a satisfactory discharged capacity retaining performance was attained, but the level was slightly inferior to that attained in Experiment Examples 1 and 2.

In contrast, in Comparative Example 3, in which applying the cathode-material-mixture paste was not performed, discharged capacity decreased, and short circuit occurred during evaluation of the cell, failing to evaluate cycle characteristic. When the cathode of Comparative Example 3 was observed, falling of cathode active material plates and breakage of the separator were observed. However, in the other examples, in which applying the cathode-material-mixture paste was performed, neither falling of cathode active material plates nor breakage of the separator was observed.

The aforementioned tests have revealed the following. Through formation of the second layer 22b having an appropriate thickness (specifically, r of 0.02 to 0.2), falling of cathode active material plates is prevented, and stress relaxation can be attained at in the separator, whereby excellent cycle characteristic can conceivably be attained. Notably, when the second layer 22b has an excessive thickness, an excessive decrease in volume fraction of cathode active material in the cathode active material layer 22 may reduce discharged capacity.

In Experiment Example 5 employing a two-step heat treatment process, the degree of orientation of (104) plane of the cathode active material plate increased, whereby more excellent discharged capacity was realized. The reason why the orientation degree is enhanced by the heat treatment process has not yet been clarified in detail, one possible reason is as follows.

Grain growth of a crystal grain in a specific direction (preferential orientation) is controlled by strain energy and surface energy. As used herein, the term "strain energy" refers to a stress induced by internal stress generated during grain growth, defects, etc. Generally, layered compounds are known to have a large strain energy. The (003) plane is most stable in terms of surface energy, and the (101) and (104) planes are stable in terms of strain energy.

Therefore, the process including calcining (first heat treatment) and incorporation of lithium (second heat treatment) is applied, strain energy predominates with change in volume during incorporation of lithium. As a result, only crystal grains having a lowest-strain-energy crystal face in a green sheet (formed by "Forming" step described above) plane selectively grow in an in-plane direction, to thereby form flat (plate-like) grains. Thus, $Li(Ni_{0.75}Co_{0.2}Al_{0.05})O_2$ ceramic plates (cathode active material plates) having a large aspect ratio and a specific crystal plane (i.e., (104) plane) which is oriented in parallel with the plate surface are conceivably formed.

4. Examples of Modifications

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

The structure of the lithium secondary battery 1 according to the present invention is not limited to the aforementioned one. For example, a gel electrolyte or a polymer electrolyte may be employed as an electrolyte.

No particular limitation is imposed on the composition of the cathode active material which can be employed in the present invention, and any composition other than the aforementioned one may be employed. For example, the cathode active material of the present invention may have any of the following compositions: lithium nickelate, lithium manganate, lithium nickelate manganate, lithium nickelate cobaltate, lithium cobaltate nickelate manganate, and lithium cobaltate manganate. These materials may contain one or more elements of Mg, Al, Si, Ca, Ti, V, Cr, Fe, Cu, Zn, Ga, Ge, Sr, Y, Zr, Nb, Mo, Ag, Sn, Sb, Te, Ba, Bi, etc. Among the compositions other than that employed in the Examples, lithium nickelate is particularly preferred, since the aforementioned effect can be remarkably attained.

The composition of the cathode active material plate-like particles 22a1 forming the first layer 22a and the composition of the cathode active material microparticles 24 contained in the second layer 22b may be identical to or different from each other. The cathode 2 or the cathode active material plate may have any 2-dimensional shape (plane shape) such as square, circle, hexagon, or a random shape. Furthermore, as described above, the cathode active material plate-like particles 22a1 forming the first layer 22a and the cathode current collector 21 may be bonded each other directly or via an electroconductive adhesive layer.

Specifically, the aforementioned cathode-material-mixture paste may contain plate-like particles as the cathode active material particles, the plate-like particles being produced by milling the cathode active material plates through the method of Example 2 into particles with appropriate sizes. By use of the plate-like particles, cell characteristics (e.g., discharged capacity) are expected to be further enhanced.

The cathode active material plates forming the first layer 22a may have voids (pores) at a 30 vol. % or less. By virtue of the voids, the internal stress generated in expansion and contraction of the crystal lattice upon charge and discharge is relaxed, cycle characteristics are expected to be further enhanced.

Figure 3:
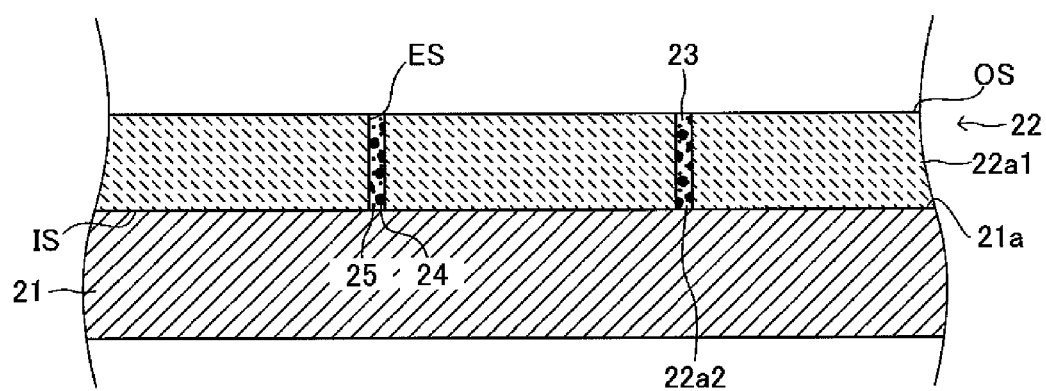
FIG. 3 is an enlarged sectional view of a modification of the cathode shown in FIG. 2.

Needless to say, a configuration in which the second layer 22b does not formed may be in the scope of the present invention if it has the filler portion 22a2 intervenes between two adjacent end surfaces ESs of cathode active material plate-like particles 22a1 (see FIG. 3). In this case, self-repairing ability may be realized with respect to cracks caused from end surfaces ES of the cathode active material plate-like particle 22a1 along the in-plane direction.

No particular limitation is imposed on the production method employed in the invention, and any method other than the aforementioned specific production procedure may be employed. That is, for example, the forming method (forming method for preparing sheet-like compact or forming method for preparing 2-dimensional cathode active material plates) is not limited to the aforementioned one.

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

The invention claimed is:

1. A lithium secondary battery cathode comprising:
   an electroconductive current collector;
   a plurality of plate-like particles formed of a cathode active material:
   wherein said particles are formed so as to have an aspect ratio of 4 to 50, the aspect ratio being a value obtained by dividing a particle size d by a thickness t, wherein the particle size d is a size of the particle as measured in a direction orthogonal to the thickness direction which defines the thickness t,
   wherein said particles are arranged in a single layer so as to cover a cathode-layer-contact surface of said electroconductive current collector at a percent area of 85 to 98% such that spaces are formed between adjacent particles, and
   wherein an inner plate surface, which is one of the two plate surfaces of each of the particles orthogonal to the thickness direction, is directly joined to and in contact with the cathode-layer-contact surface; and
   a binder containing microparticles formed of the cathode active material, said microparticles being smaller than the plate-like particles, said binder intervening between two adjacent plate-like particles such that the binder fills the space therebetween along the juxtaposition direction of the plate-like particles.

2. A lithium secondary battery cathode according to claim 1, wherein the binder is disposed so as to cover an outer plate surface, which is the other one of the two plate surfaces of each of the plate-like particles.

3. A lithium secondary battery cathode according to claim 2, which satisfies the relationship: $0.02 \leq r \leq 0.2$, wherein r is $t2/t$, and t2 represents the thickness of the portion of the binder covering the plate-like particles contained in the binder.

4. A lithium secondary battery cathode according to claim 1, wherein the plate-like particles have a layered rock salt structure, the ratio of intensity of diffraction by the 003) plane to intensity of diffraction by the (104) plane, (003)/(104), as obtained through X-ray diffraction of surfaces of the plate-like particles, is 1.6 or less.

5. A lithium secondary battery cathode according to claim 2, wherein the plate-like particles have a layered rock salt structure, the ratio of intensity of diffraction by the 003) plane to intensity of diffraction by the (104) plane, (003)/104), as obtained through X-ray diffraction of surfaces of the plate-like particles, is 1.6 or less.

6. A lithium secondary battery cathode according to claim 3, wherein the plate-like particles have a layered rock salt structure, the ratio of intensity of diffraction by the (003) plane to intensity of diffraction by the (104) plane, (003)/(104), as obtained through X-ray diffraction of surfaces of the plate-like particles, is 1.6 or less.

7. A lithium secondary battery cathode comprising:
an electroconductive current collector;
a plurality of plate-like particles formed of a cathode active material;
  wherein said particles are formed so as to have an aspect ratio of 4 to 50, the aspect ratio being a value obtained by dividing a particle size d by a thickness t, wherein the particle size d is a size of the particle as measured in a direction orthogonal to the thickness direction which defines the thickness t,
  wherein said particles are arranged so as to cover a cathode-layer-contact surface of said electroconductive current collector at a percent area of 85 to 98% such that spaces are formed between adjacent particles, and
  wherein an inner plate surface, which is one of the two plate surfaces of each of the particles orthogonal to the thickness direction, is directly joined to and in contact with the cathode-layer-contact surface; and
a binder containing microparticles formed of the cathode active material, said microparticles being smaller than the plate-like particles, said binder intervening between two adjacent plate-like particles such that the binder fills the space therebetween along the juxtaposition direction of the plate-like particles,
  wherein the binder is disposed so as to cover an outer plate surface, which is the other one of the two plate surfaces of each of the plate-like particles.

* * * * *